United States Patent
Yokoyama et al.

(10) Patent No.: US 9,142,862 B2
(45) Date of Patent: Sep. 22, 2015

(54) NONAQUEOUS ELECTROLYTE SECONDARY BATTERY

(71) Applicant: SANYO Electric Co., Ltd., Moriguchi-shi, Osaka (JP)

(72) Inventors: Yoshinori Yokoyama, Itano-gun (JP); Takayuki Hattori, Minamiawaji (JP); Yasuhiro Yamauchi, Sumoto (JP)

(73) Assignee: SANYO ELECTRIC CO., LTD., Moriguchi-shi (JP)

( * ) Notice: Subject to any disclaimer, the term of this patent is extended or adjusted under 35 U.S.C. 154(b) by 12 days.

(21) Appl. No.: 13/962,044

(22) Filed: Aug. 8, 2013

(65) Prior Publication Data
US 2014/0045002 A1 Feb. 13, 2014

(30) Foreign Application Priority Data
Aug. 9, 2012 (JP) ................................. 2012-176792

(51) Int. Cl.
*H01M 10/0563* (2010.01)
*H01M 2/02* (2006.01)
*H01M 2/04* (2006.01)
*H01M 10/05* (2010.01)
*H01M 10/0568* (2010.01)

(52) U.S. Cl.
CPC ........ *H01M 10/0563* (2013.01); *H01M 2/0217* (2013.01); *H01M 2/0426* (2013.01); *H01M 10/05* (2013.01); *H01M 10/0568* (2013.01); *Y02E 60/122* (2013.01)

(58) Field of Classification Search
USPC ............................................................ 429/61
See application file for complete search history.

(56) References Cited

U.S. PATENT DOCUMENTS

| | | | |
|---|---|---|---|
| 2004/0076887 A1* | 4/2004 | Panitz et al. | 429/330 |
| 2011/0135976 A1* | 6/2011 | Byun | 429/56 |
| 2012/0052341 A1* | 3/2012 | Kim et al. | 429/53 |

FOREIGN PATENT DOCUMENTS

JP  2011-018645 A  1/2011

* cited by examiner

*Primary Examiner* — Muhammad Siddiquee
(74) *Attorney, Agent, or Firm* — Westerman, Hattori, Daniels & Adrian, LLP

(57) ABSTRACT

A nonaqueous electrolyte secondary battery according to an embodiment of the present invention includes an electrode assembly, a nonaqueous electrolyte, and a container. The electrode assembly includes a positive electrode, a negative electrode, and a separator. The negative electrode is opposed to the positive electrode. The separator is disposed between the positive electrode and the negative electrode. The container houses the electrode assembly and the nonaqueous electrolyte. The container has a positive electrode terminal and a negative electrode terminal. The positive electrode terminal is electrically connected to the positive electrode. The negative electrode terminal is electrically connected to the negative electrode. The container further includes a short-circuiting mechanism that short-circuits the positive electrode terminal and the negative electrode terminal if the internal pressure rises. The nonaqueous electrolyte contains lithium bis(oxalato)borate (LiBOB).

4 Claims, 6 Drawing Sheets

NONAQUEOUS ELECTROLYTE SECONDARY BATTERY

TECHNICAL FIELD

The present invention relates to a nonaqueous electrolyte secondary battery.

BACKGROUND ART

In recent years, there have been various endeavors to use nonaqueous electrolyte secondary batteries in, for example, electric vehicles, hybrid cars, and the like. In such applications, it is necessary to ensure safety in cases where, if the nonaqueous electrolyte secondary battery is subjected to impact, excessive heat may be generated in the interior and the electrolyte may break down, with the result that the interior pressure rises. Therefore, JP-A-2011-18645 proposes the provision of a pressure-sensitive forced short-circuiting mechanism in nonaqueous electrolyte secondary batteries.

In a nonaqueous electrolyte secondary battery, the pressure inside the container increases due to deterioration. Therefore, when there is a prolonged use period, the forced short-circuiting mechanism may activate erroneously during the regular use.

SUMMARY

A principal advantage of some aspects of the invention is to provide a nonaqueous electrolyte secondary battery in which the short-circuiting mechanism is not prone to activate erroneously.

A nonaqueous electrolyte secondary battery of an aspect of the invention includes an electrode assembly, a nonaqueous electrolyte, and a container. The electrode assembly includes a positive electrode, a negative electrode, and a separator. The negative electrode is opposed to the positive electrode. The separator is disposed between the positive electrode and the negative electrode. The container houses the electrode assembly and the nonaqueous electrolyte. The container has a positive electrode terminal and a negative electrode terminal. The positive electrode terminal is electrically connected to the positive electrode. The negative electrode terminal is electrically connected to the negative electrode. The container further includes a short-circuiting mechanism. The short-circuiting mechanism short-circuits the positive electrode and negative electrode if the internal pressure rises. The nonaqueous electrolyte contains lithium bis(oxalato)borate (LiBOB).

The invention can provide a nonaqueous electrolyte secondary battery in which the short-circuiting mechanism will not be prone to activate erroneously.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
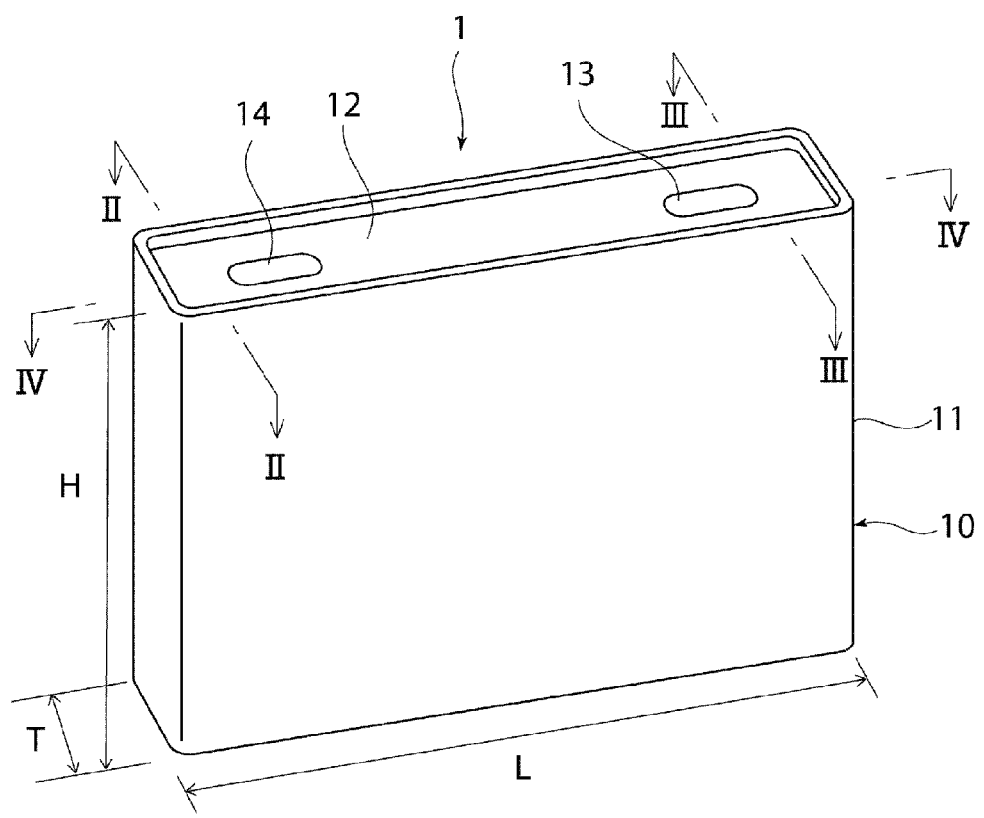
FIG. 1 is a simplified perspective view of a nonaqueous electrolyte secondary battery according to an embodiment of the invention.
Figure 2:
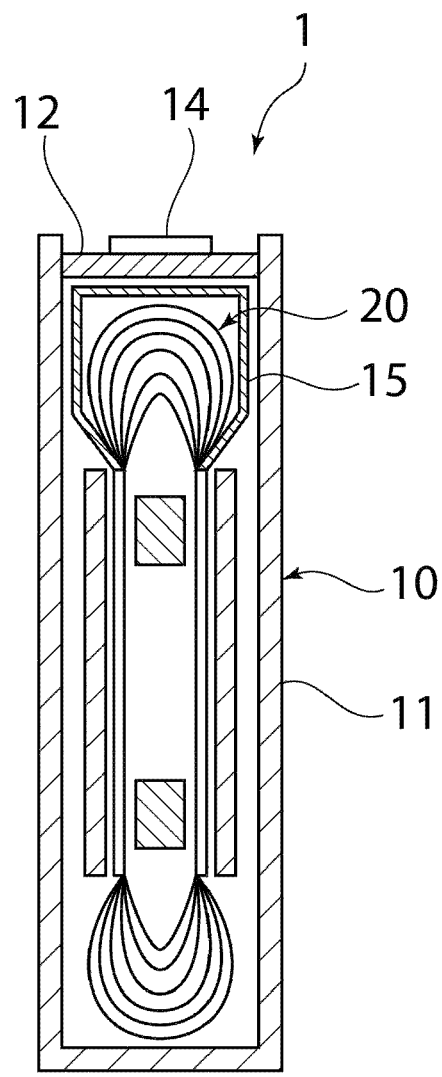
FIG. 2 is a simplified sectional view through line II-II in FIG. 1.
Figure 3:
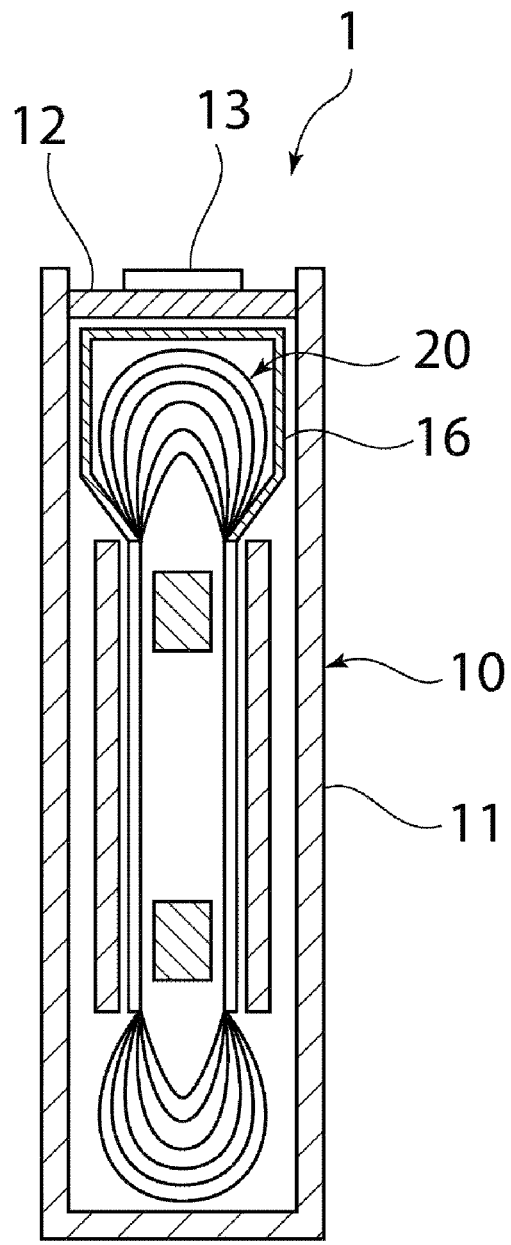
FIG. 3 is a simplified sectional view through line III-III in FIG. 1.

A preferred embodiment that implements the invention will now be described with reference to the accompanying drawings. However, the following embodiment is merely an illustrative example and does not limit the invention in any way.

In the accompanying drawings, to which reference will be made in describing the embodiment and other matters, members that have substantially the same functions are assigned the same reference numerals throughout. In addition, the accompanying drawings, to which reference will be made in describing the embodiment and other matters, are schematic representations, and the proportions of the dimensions of the objects depicted in the drawings may differ from the proportions of the dimensions of the actual objects. The proportions of the dimensions of the objects may differ among the drawings. The concrete proportions of the dimensions of the objects should be determined in view of the following description.

A nonaqueous electrolyte secondary battery 1 shown in FIG. 1 is a prismatic nonaqueous electrolyte secondary battery. The nonaqueous electrolyte secondary battery 1 can be used for any kind of application, and will preferably be used in an electric vehicle and a hybrid vehicle, for example. The capacity of the nonaqueous electrolyte secondary battery 1 is preferably not less than 15 Ah, further preferably not less than 18 Ah, and still further preferably not less than 20 Ah. Normally, the capacity of the nonaqueous electrolyte secondary battery 1 will be not more than 50 Ah.

The nonaqueous electrolyte secondary battery 1 includes a container 10 shown in FIGS. 1 to 4, and an electrode assembly 20 shown in FIGS. 2 to 5. The nonaqueous electrolyte secondary battery 1 is a prismatic nonaqueous electrolyte secondary battery in which the container 10 is prismatic (parallelepiped) in shape. The length dimension L of the container 10 will preferably be 100 to 200 mm, and further preferably will be 140 to 180 mm. The thickness dimension T of the container 10 will preferably be 10 to 30 mm, and further preferably will be 20 to 28 mm. The height dimension H of the container 10 will preferably be 75 to 100 mm, and further preferably will be 80 to 95 mm. The ratio of the length dimension L of the container 10 to its height dimension H (L/H) will preferably be 1.5 to 2.5, and further preferably will be 1.8 to 2.2.

Figure 5:
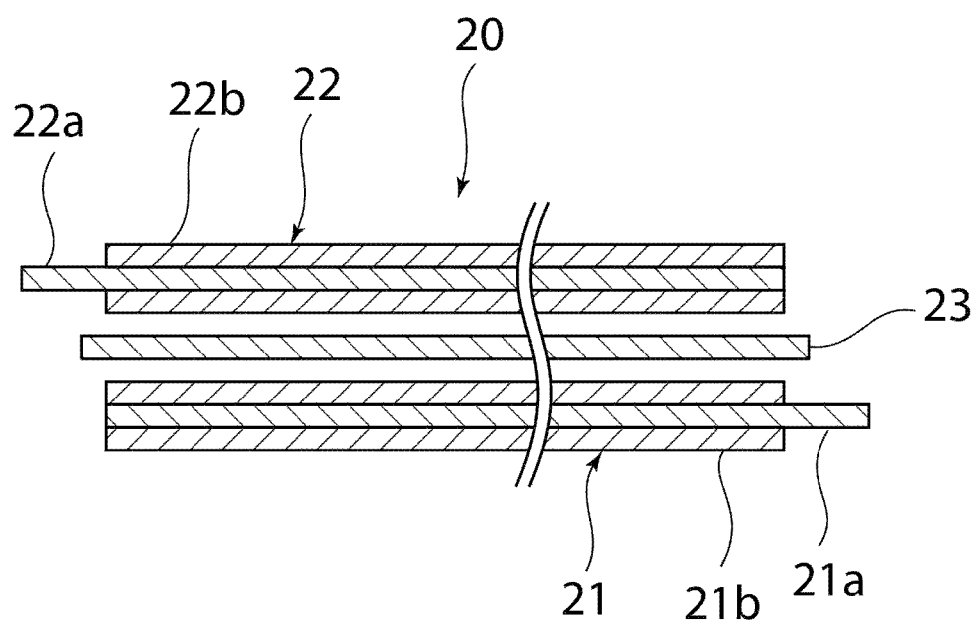
FIG. 5 is a simplified sectional view of part of the electrode assembly in an embodiment of the invention.

As shown in FIG. 5, the electrode assembly 20 includes the positive electrode 21, the negative electrode 22, and a separator 23. The positive electrode 21 and the negative electrode 22 are opposed to each other. The separator 23 is disposed between the positive electrode 21 and the negative electrode 22. The positive electrode 21, the negative electrode 22, and the separator 23 are wound and then pressed into a flattened shape. In other words, the electrode assembly 20 includes a flat wound positive electrode 21, the negative electrode 22, and the separator 23.

The positive electrode 21 includes a positive electrode substrate 21*a* and a positive electrode active material layer 21*b*. The positive electrode substrate 21*a* can be formed of aluminum, an aluminum alloy, or other materials. The positive electrode active material layer 21*b* is provided on at least one surface of the positive electrode substrate 21*a*. The positive electrode active material layer 21b contains a positive electrode active material. An example of the positive electrode active material that will preferably be used is a lithium oxide containing at least one of cobalt, nickel, and manganese. The following shows specific examples of such a lithium oxide containing at least one of cobalt, nickel, and manganese: lithium-containing nickel-cobalt-manganese complex oxides ($LiNi_xCo_yMn_zO_2$, $x+y+z=1$, $0 \leq x \leq 1$, $0 \leq y \leq 1$, $0 \leq z \leq 1$); lithium cobalt oxide ($LiCoO_2$); lithium manganese oxide ($LiMn_2O_4$); lithium nickel oxide ($LiNiO_2$); and a lithium-containing transition metal complex oxide such as a compound obtained by replacing part of the transition metal contained in these oxides with another element. Of these, lithium-containing nickel-cobalt-manganese complex oxides ($LiNi_xCo_yMn_zO_2$, $x+y+z=1$, $0 \leq x \leq 1$, $0 \leq y \leq 1$, $0 \leq z \leq 1$) and a lithium-containing transition metal complex oxide such as a compound obtained by replacing part of the transition metal contained in such oxide with another element will preferably be used as the positive electrode active material. The positive electrode active material layer 21b may contain another component such as conductive material and binder as appropriate in addition to the positive electrode active material.

The negative electrode 22 includes a negative electrode substrate 22a and a negative electrode active material layer 22b. The negative electrode substrate 22a can be formed of copper, a copper alloy, or other materials. The negative electrode active material layer 22b is provided on at least one surface of the negative electrode substrate 22a. The negative electrode substrate 22a contains negative electrode active material. There is no particular limitation on the negative electrode active material, provided that it is able to reversibly absorb and desorb lithium. Examples of the negative electrode active material that will preferably be used are: carbon material, material that alloys with lithium, and metal oxide such as tin oxide. The following specific examples of carbon material can be cited: natural graphite, artificial graphite, mesophase pitch-based carbon fiber (MCF), mesocarbon microbeads (MCMB), coke, hard carbon, fullerene, and carbon nanotubes. Examples of material that can alloy with lithium are: one or more metals selected from the group consisting of silicon, germanium, tin, and aluminum, or an alloy containing one or more metals selected from the group consisting of silicon, germanium, tin, and aluminum. Of these, natural graphite, artificial graphite, and mesophase pitch-based carbon fiber (MCF) will preferably be used as the negative electrode active material. The negative electrode active material layer 22b may contain another component such as conductive material and binder as appropriate in addition to the negative electrode active material.

The separator can be formed of a porous sheet of plastic such as polyethylene and polypropylene.

The electrode assembly 20 is housed inside the container 10. The nonaqueous electrolyte is also housed inside the container 10. The nonaqueous electrolyte contains lithium bis(oxalato)borate (LiBOB) as solute. In addition to LiBOB, the nonaqueous electrolyte may contain as solute a substance such as: $LiXF_y$ (where X is P, As, Sb, B, Bi, Al, Ga, or In, and y is 6 when X is P, As, or Sb, and y is 4 when X is B, Bi, Al, Ga, or In); lithium perfluoroalkyl sulfonic acid imide $LiN(C_mF_{2m+1}SO_2)(C_nF_{2n+1}SO_2)$ (where m and n are independently integers from 1 to 4); lithium perfluoroalkyl sulfonic acid methide $LiC(C_pF_{2p+1}SO_2)(C_qF_{2q+1}SO_2)(C_rF_{2r+1}SO_2)$ (where p, q, and r are independently integers from 1 to 4); $LiCF_3SO_3$; $LiClO_4$; $Li_2B_{10}Cl_{10}$; and $Li_2B_{12}Cl_{12}$. Of these, the nonaqueous electrolyte may contain, as solute, at least one of $LiPF_6$, $LiBF_4$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$, for example. The nonaqueous electrolyte may contain as solvent, for example, cyclic carbonate, chain carbonate, or a mixture of cyclic carbonate and chain carbonate. Specific examples of cyclic carbonate are ethylene carbonate, propylene carbonate, butylene carbonate, and vinylene carbonate. Specific examples of chain carbonate are dimethyl carbonate, methylethyl carbonate, and diethyl carbonate.

The container 10 has a container body 11 and a sealing plate 12. The container body 11 and the sealing plate 12 are both formed using metal. For example, the container body 11 and the sealing plate 12 can each be formed using aluminum or of stainless steel.

The container body 11 is provided in the form of a rectangular tube of which one end is closed. In other words, the container body 11 is provided in the form of a bottomed square tube. The container body 11 has an opening. This opening is sealed up by the sealing plate 12. Thereby, the parallelepiped interior space is formed into a compartment. The electrode assembly 20 and the nonaqueous electrolyte are housed in this interior space.

Figure 4:
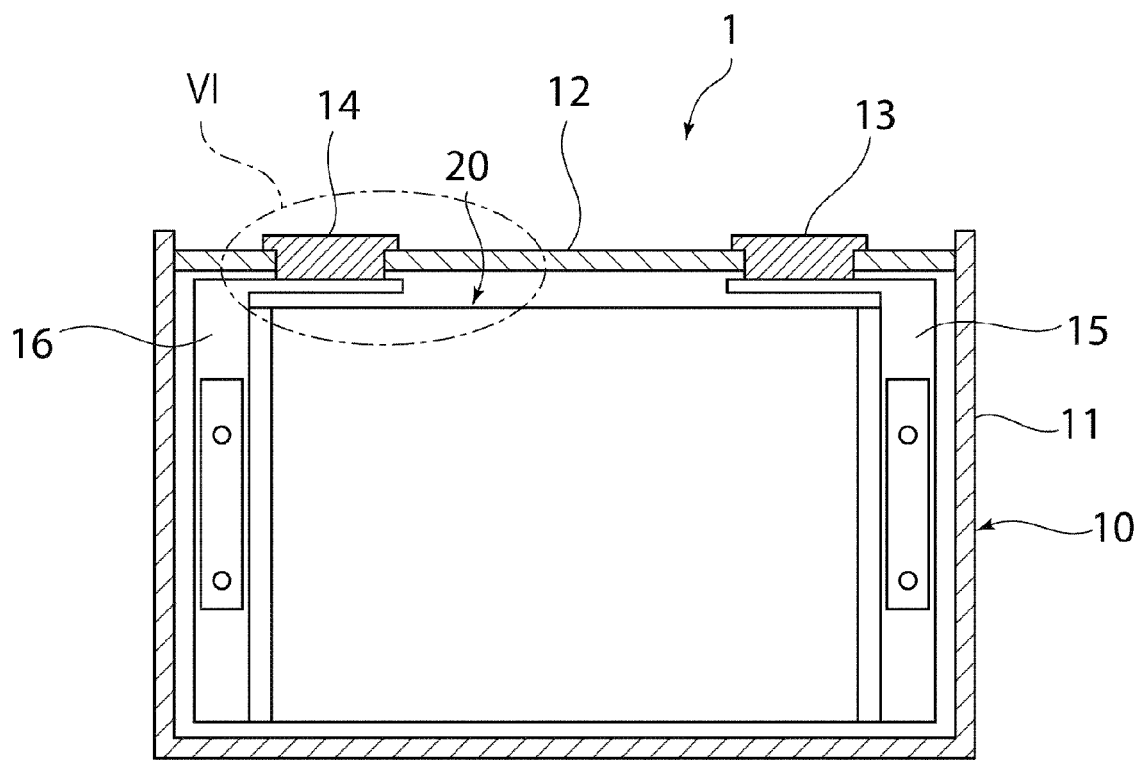
FIG. 4 is a simplified sectional view through line IV-IV in FIG. 1.

The sealing plate 12 has a sealing plate body 17. The positive electrode terminal 13 and negative electrode terminal 14 are connected to the sealing plate body 17. As shown in FIG. 4, the positive electrode terminal 13 is electrically connected to a positive electrode substrate 21a of a positive electrode 21 by positive electrode collector 15. The positive electrode collector 15 can be formed of aluminum, an aluminum alloy, or other materials. The negative electrode terminal 14 is electrically connected to a negative electrode substrate 22a of a negative electrode 22 by negative electrode collector 16. The negative electrode collector 16 can be formed of copper, a copper alloy, or other materials.

Figure 6:
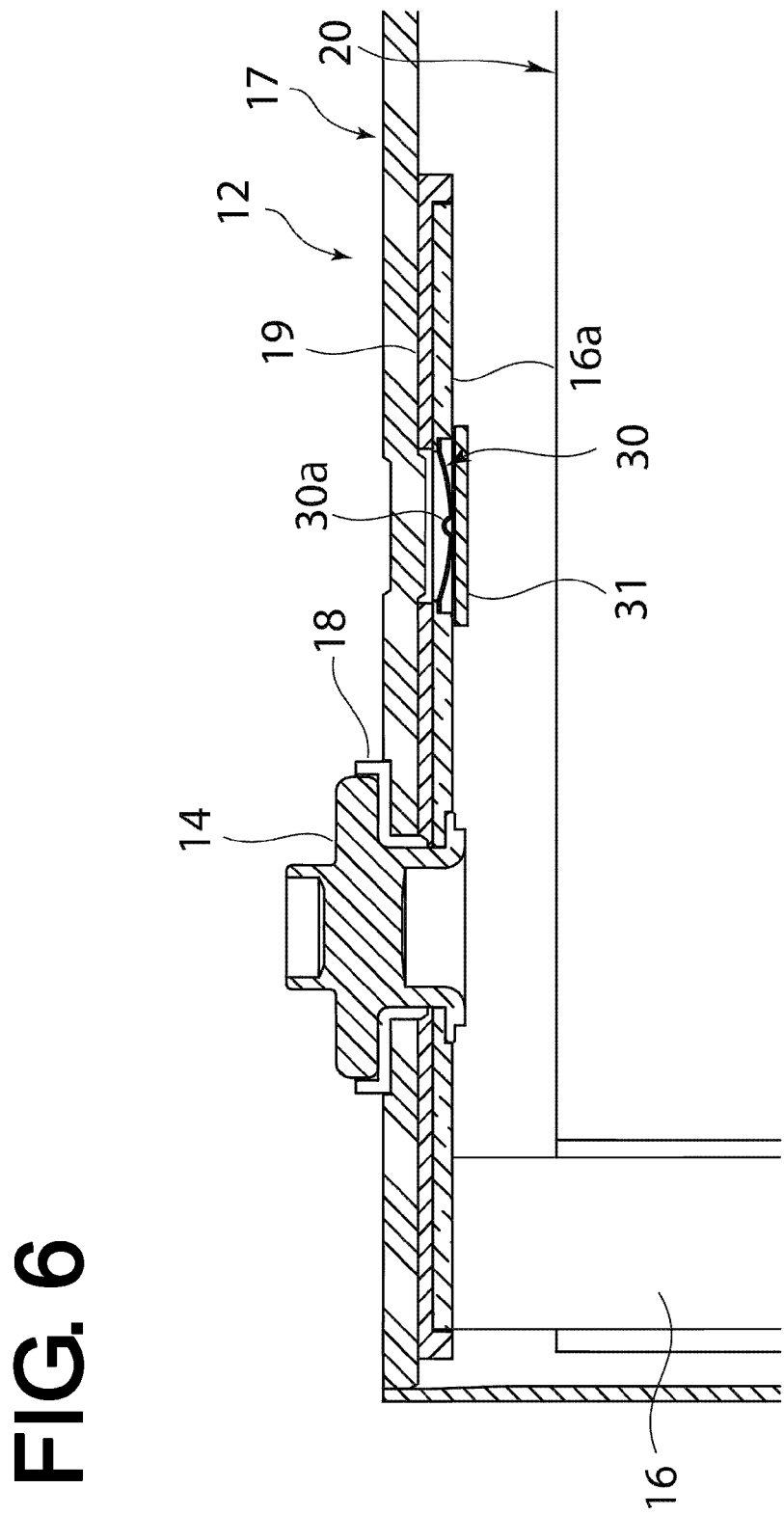
FIG. 6 is an enlarged schematic sectional view of portion VI in FIG. 4.

The sealing plate body 17 is electrically connected to the positive electrode terminal 13. Meanwhile, the sealing plate body 17 is insulated from the negative electrode terminal 14 by an insulating material 18, as shown in FIG. 6.

Part of the negative electrode collector 16 is opposed to the sealing plate body 17. An insulating plate 19 is disposed between the sealing plate body 17 and an opposed portion 16a of the negative electrode collector 16 that is opposed to the sealing plate body 17. The opposed portion 16a is insulated from the sealing plate body 17 by the insulating plate 19.

The insulating plate 19 has an opening through the direction of its thickness. An inversion plate 30 that is opposed to the sealing plate body 17 and forms the short-circuiting mechanism is installed to the opposed portion 16a in the area where the opening is provided. The inversion plate 30 is electrically connected to the opposed portion 16a.

The inversion plate 30 is provided in a convex form toward the opposite side from the sealing plate body 17. If the nonaqueous electrolyte secondary battery 1 enters an abnormal state and the pressure inside the container 10 rises due to, for example, the nonaqueous electrolyte secondary battery 1 being subjected to impact or the like trouble, the inversion plate 30 will be deformed into a convex form toward the sealing plate body 17. This will bring the inversion plate 30, which is connected to the negative electrode terminal 14, into contact with the sealing plate body 17, which is connected to the positive electrode terminal 14, so that the negative electrode terminal 14 and positive electrode terminal 13 are short-circuited. As a result, the separator 23 will melt down and the current will be shut off. In addition, deformation of the sealing plate body 17 when the battery internal pressure rises is prevented by providing the sealing plate body 17 with a protruding portion that is opposed to the inversion plate 30.

The apex of the inversion plate 30 has a protruding portion 30a that protrudes toward the sealing plate body 17. In addition, the portion of the sealing plate body 17 that is opposed to the inversion plate 30 protrudes toward the inversion plate 30. Because of this, the inversion plate 30 and the sealing plate body 17 readily come into contact when the inversion plate 30 inverts.

The inversion plate 30 is provided with a protective cover 31 on its opposite side from the sealing plate body 17. By means of this protective cover 31, the arc that is produced when the sealing plate body 17 and the inversion plate 30 come into contact is prevented from leaping toward the electrode assembly 20. The protective cover 31 and the negative electrode collector 16 are provided spaced apart, so that the internal pressure is exerted on the inversion plate 30. In addition, the container 10 is provided in such a manner that the nonaqueous electrolyte will not enter the space between the inversion plate 30 and the sealing plate body 17 and will not cause the activation resistance of the inversion plate 30 to rise.

The nonaqueous electrolyte in the nonaqueous electrolyte secondary battery 1 contains lithium bis(oxalato)borate as solute. Thanks to this, even when the nonaqueous electrolyte secondary battery 1 is used over prolonged periods, battery deterioration will be prevented, and so the pressure inside the container 10 will not be prone to rise. Hence, the short-circuiting mechanism including the inversion plate 30 will not be prone to activate erroneously.

In the interest of more effectively preventing erroneous activation of the inversion plate 30, the content of LiBOB in the nonaqueous electrolyte will preferably be not less than 0.05 mol/L, more preferably not less than 0.08 mol/L, and still more preferably not less than 0.1 mol/L. However, if the content of LiBOB in the nonaqueous electrolyte is too high, the nonaqueous electrolyte secondary battery 1 could heat up too much in the event of battery trouble. In addition, the battery characteristics could decline due to increase in the battery internal resistance. Hence, the content of LiBOB in the nonaqueous electrolyte will preferably be not more than 0.5 mol/L, and more preferably will be not more than 0.3 mol/L.

The preferable content range for LiBOB is based on the nonaqueous electrolyte in the nonaqueous electrolyte secondary battery immediately after assembly and before the first charging. The reason for providing such basis is that when a nonaqueous electrolyte secondary battery containing LiBOB is charged, its content level gradually declines.

It will suffice for LiBOB to be present in the electrolyte immediately after the nonaqueous electrolyte secondary battery has been assembled. For example, after charge-discharge has been performed following assembly, the LiBOB may in some cases be present in the form of a LiBOB alteration. In other cases, at least a part of the LiBOB or the LiBOB alteration may be present on the negative electrode active material layer. Such cases are included in the technical scope of the invention.

What is claimed is:

1. A nonaqueous electrolyte secondary battery, comprising:
   an electrode assembly including a positive electrode, a negative electrode opposed to the positive electrode, and a separator disposed between the positive electrode and the negative electrode;
   a nonaqueous electrolyte; and
   a container housing the electrode assembly and the nonaqueous electrolyte, and having a positive electrode terminal electrically connected to the positive electrode and a negative electrode terminal electrically connected to the negative electrode; wherein
   the container further includes a short-circuiting mechanism that short-circuits the positive electrode terminal and negative electrode terminal when the internal pressure rises,
   the nonaqueous electrolyte contains lithium bis(oxalato) borate (LiBOB) and
   the short circuiting mechanism includes an inversion plate which is a convex form protruding toward the electrode assembly and is provided with a protruding portion that protrudes toward outside of the battery at the center of the inversion plate on a side facing toward outside of the battery.

2. The nonaqueous electrolyte secondary battery according to claim 1, wherein the content of the LiBOB in the nonaqueous electrolyte is not less than 0.05 mol/L.

3. The nonaqueous electrolyte secondary battery according to claim 1, wherein
   the inversion plate is provided in such a manner as to be deformed into a convex form toward outside of the battery when the internal pressure inside the container rises.

4. A nonaqueous electrolyte secondary battery, comprising:
   an electrode assembly including a positive electrode, a negative electrode opposed to the positive electrode, and a separator disposed between the positive electrode and the negative electrode;
   a nonaqueous electrolyte; and
   a container housing the electrode assembly and the nonaqueous electrolyte, and having a positive electrode terminal electrically connected to the positive electrode and a negative electrode terminal electrically connected to the negative electrode; wherein
   the container further includes a short-circuiting mechanism that short-circuits the positive electrode terminal and negative electrode terminal when the internal pressure rises, and
   the short circuiting mechanism includes an inversion plate which is a convex form protruding toward the electrode assembly and is provided with a protruding portion that protrudes toward outside of the battery at the center of the inversion plate on a side facing toward outside of the battery.

* * * * *